(12) United States Patent
Wu

(10) Patent No.: US 9,939,856 B1
(45) Date of Patent: Apr. 10, 2018

(54) SUPPORTING FRAME

(71) Applicant: COOLER MASTER TECHNOLOGY INC., New Taipei (TW)

(72) Inventor: Shun-Zhang Wu, New Taipei (TW)

(73) Assignee: Cooler Master Technology Inc., New Taipei (TW)

( * ) Notice: Subject to any disclaimer, the term of this patent is extended or adjusted under 35 U.S.C. 154(b) by 0 days.

(21) Appl. No.: 15/593,968

(22) Filed: May 12, 2017

(30) Foreign Application Priority Data

Dec. 16, 2016 (CN) .................... 2016 2 1383396 U
Jan. 20, 2017 (TW) ............................ 106201106 U

(51) Int. Cl.
| | |
|---|---|
| *G06F 1/18* | (2006.01) |
| *F16M 11/04* | (2006.01) |
| *F16M 13/02* | (2006.01) |
| *F16B 1/00* | (2006.01) |
| *F21V 33/00* | (2006.01) |

(Continued)

(52) U.S. Cl.
CPC ............ *G06F 1/185* (2013.01); *A47B 47/047* (2013.01); *F16B 1/00* (2013.01); *F16M 11/046* (2013.01); *F16M 13/022* (2013.01); *F21V 33/00* (2013.01); *F21V 33/002* (2013.01); *G06F 1/183* (2013.01); *G06F 1/184* (2013.01); *G09F 13/00* (2013.01); *G09F 23/00* (2013.01); *A47B 2087/023* (2013.01); *F16B 2001/0035* (2013.01); *F16M 13/02* (2013.01)

(58) Field of Classification Search
CPC . A47B 47/047; A47B 2087/023; G06F 1/185; G06F 1/183; G06F 1/184; F16M 11/046; F16M 13/02; F21V 33/002; F16B 2001/0035

USPC ........ 248/179.1, 519, 218.4, 222.13, 222.51, 248/222.52, 224.8, 124.1, 124.2, 125.2, 248/125.3, 125.7, 125.9, 227.3; 403/91, 403/94, 97, 99, 102, 108; 361/801; 211/123, 207

See application file for complete search history.

(56) References Cited

U.S. PATENT DOCUMENTS

| | | | | |
|---|---|---|---|---|
| 422,025 | A * | 2/1890 | MacDonald | .......... F16D 41/066 192/45.001 |
| 2,530,123 | A * | 11/1950 | Ingwer | ................... D05B 79/00 248/124.2 |

(Continued)

FOREIGN PATENT DOCUMENTS

| | | |
|---|---|---|
| CN | 204679927 U | 9/2015 |
| TW | 398646 U | 7/2000 |
| TW | 587730 U | 5/2004 |

*Primary Examiner* — Eret C McNichols
(74) *Attorney, Agent, or Firm* — Muncy, Geissler, Olds & Lowe, P.C.

(57) ABSTRACT

A supporting frame includes at least one supporting element, a base and a light-permeable pillar. The supporting element has a first through-hole. A cam is disposed in the supporting element and has a second through-hole and a turning portion. The second through-hole is disposed corresponding to the first through-hole. The base extends to form a sleeve. The light-permeable pillar passes through the first through-hole and the second through-hole and is inserted into the sleeve. The supporting element is capable of sliding along the light-permeable pillar. The turning portion is configured for pushing against an inner wall of the supporting element for fixing the supporting element on the light-permeable pillar.

14 Claims, 5 Drawing Sheets

(51) Int. Cl.
    *G09F 13/00*    (2006.01)
    *G09F 23/00*    (2006.01)
    *A47B 47/04*    (2006.01)
    *A47B 87/02*    (2006.01)

(56) References Cited

U.S. PATENT DOCUMENTS

| | | | | | |
|---|---|---|---|---|---|
| 3,167,292 | A | * | 1/1965 | Meyerowitz | A47B 96/06 108/146 |
| 3,327,310 | A | * | 6/1967 | Bethune | H01Q 1/1235 248/200.1 |
| 3,762,674 | A | * | 10/1973 | Ortega | E02D 27/42 248/346.04 |
| 3,917,231 | A | * | 11/1975 | Fink | E01F 13/028 256/1 |
| 3,976,273 | A | * | 8/1976 | Kussow | A47C 9/04 119/523 |
| 4,209,099 | A | * | 6/1980 | Wickes | A47B 61/003 211/105.3 |
| 4,435,105 | A | * | 3/1984 | Rampley | F16B 7/1454 403/109.5 |
| D291,061 | S | * | 7/1987 | Nakatani | D8/396 |
| 4,744,690 | A | * | 5/1988 | Hsieh | F16B 7/1418 248/411 |
| 5,056,753 | A | * | 10/1991 | Lunau | A47K 17/02 248/200.1 |
| 5,069,573 | A | * | 12/1991 | Blake | A45F 3/08 403/191 |
| 5,356,183 | A | * | 10/1994 | Cole | F16L 25/0045 285/148.27 |
| 5,572,835 | A | * | 11/1996 | Atkins | G09F 17/00 116/173 |
| 5,603,628 | A | * | 2/1997 | Schapiro, Jr. | H01R 13/639 361/759 |
| 5,623,396 | A | * | 4/1997 | Blackwell | H05K 7/1405 361/759 |
| 5,822,193 | A | * | 10/1998 | Summers | H05K 7/1408 361/740 |
| 5,996,962 | A | * | 12/1999 | Chang | G06F 1/184 248/694 |
| 6,129,320 | A | * | 10/2000 | Warren-Pfaeffle | A61G 9/00 248/124.1 |
| 6,375,164 | B1 | * | 4/2002 | Siegler | E01F 13/028 256/1 |
| 6,409,518 | B1 | * | 6/2002 | Hung | G06F 1/184 361/801 |
| 6,520,464 | B1 | * | 2/2003 | Morrissey | F16B 9/023 248/222.52 |
| 6,575,316 | B2 | * | 6/2003 | Lin | A47K 10/38 211/107 |
| 6,595,496 | B1 | * | 7/2003 | Langlie | A01K 3/00 256/1 |
| 6,870,744 | B2 | * | 3/2005 | Kosugi | G06F 1/184 211/41.17 |
| 6,967,850 | B2 | * | 11/2005 | Barr | H05K 7/1402 361/679.32 |
| 7,278,872 | B2 | * | 10/2007 | Brown | G06F 1/185 361/801 |
| 7,475,859 | B2 | * | 1/2009 | Selders | A45B 3/06 211/107 |
| 7,787,258 | B2 | * | 8/2010 | Cheney | G06F 1/185 312/223.2 |
| 7,990,735 | B2 | * | 8/2011 | Yeh | H05K 7/1402 361/801 |
| 8,113,475 | B2 | * | 2/2012 | Whittemore | B65H 49/26 248/121 |
| 8,451,623 | B2 | * | 5/2013 | Chiu | G06F 1/186 361/679.02 |
| 8,553,424 | B2 | * | 10/2013 | Chiang | H05K 7/1408 361/759 |
| 8,733,720 | B2 | * | 5/2014 | Wilkinson | G09F 7/002 116/174 |
| 8,746,917 | B2 | * | 6/2014 | Zimmerman | A45D 42/00 219/220 |
| 8,861,208 | B2 | * | 10/2014 | Hwang | H05K 7/1404 361/727 |
| 9,010,703 | B2 | * | 4/2015 | Tresserras Picas | E04H 12/24 108/106 |
| 9,471,113 | B2 | * | 10/2016 | Fan | G06F 1/185 |
| 9,765,924 | B2 | * | 9/2017 | Chi | F16M 13/02 |
| 2004/0226903 | A1 | | 11/2004 | Wang | A47B 57/00 211/187 |
| 2004/0257784 | A1 | * | 12/2004 | Dalisay | H05K 7/1409 361/801 |
| 2007/0045491 | A1 | * | 3/2007 | Spencer | E04G 13/00 248/218.4 |
| 2008/0156759 | A1 | * | 7/2008 | Lai | A47B 47/0083 211/187 |
| 2009/0071614 | A1 | * | 3/2009 | Whittemore | A47H 21/00 160/405 |
| 2009/0294604 | A1 | * | 12/2009 | Sunderland | A61M 5/1415 248/124.1 |
| 2010/0314524 | A1 | * | 12/2010 | Fuchs | A45B 19/04 248/519 |
| 2013/0200246 | A1 | * | 8/2013 | VanBenschoten | F16M 11/42 248/519 |
| 2014/0311999 | A1 | * | 10/2014 | Lindo | A47K 3/281 211/207 |
| 2014/0314470 | A1 | * | 10/2014 | Wu | A47B 47/045 403/217 |
| 2016/0007742 | A1 | * | 1/2016 | Yang | A47B 61/00 211/123 |

\* cited by examiner

SUPPORTING FRAME

CROSS REFERENCE TO RELATED APPLICATIONS

This Non-provisional application claims priority under 35 U.S.C. § 119(a) on Patent Application No(s). 106201106 filed in Taiwan, Republic of China on Jan. 20, 2017, and 201621383396.3 filed in People's Republic of China on Dec. 16, 2016, the entire contents of which are hereby incorporated by reference.

BACKGROUND OF THE INVENTION

Field of Invention

The present disclosure relates to a supporting frame and, in particular, to a supporting frame capable of adjusting the supporting position.

Related Art

A computer is mainly composed of the case, power supply, mainboard, CPU, graphic card, interface card, RAM and the likes. Most of the above components are installed inside the case.

The graphic processor of the graphic card has powerful calculation ability, so the graphic card usually has longer length than other graphic cards or interface card. The long graphic card is generally inserted and supported by the socket only, so that the pins of the graphic card may be wore off and thus cause poor electrical contact.

Therefore, it is an important subject to provide a supporting frame that can be installed inside the host apparatus and adjust the supporting position.

SUMMARY OF THE INVENTION

An objective of this disclosure is to provide a supporting frame capable of adjusting the supporting position.

To achieve the above objective, the present disclosure discloses a supporting frame, which includes at least a supporting element, a base and a light-permeable pillar. The supporting element has a first through-hole. A cam is disposed in the supporting element and has a second through-hole and a turning portion. The second through-hole is disposed corresponding to the first through-hole. The base extends to form a sleeve. The light-permeable pillar passes through the first through-hole and the second through-hole and is inserted into the sleeve. The supporting element is capable of sliding along the light-permeable pillar, and the turning portion is configured for pushing against an inner wall of the supporting element for fixing the supporting element on the light-permeable pillar.

In one embodiment, the base is configured with a plurality of feet and a plurality of magnetic elements.

In one embodiment, the base is configured with a plurality of light-emitting elements.

In one embodiment, the cam further has a holding portion, and the turning portion is protruded from the holding portion. The holding portion is capable of moving along a first direction for pushing the turning portion to contact against the inner wall of the supporting element, and the holding portion is also capable of moving along a second direction for pulling the turning portion to not contact against the inner wall of the supporting element.

In one embodiment, the supporting frame is further configured with a marker having a third through-hole, and the light-permeable pillar passes through the first through-hole, the second through-hole and the third through-hole and is inserted into the sleeve.

To achieve the above objective, the present discloses also discloses a supporting frame, which includes at least a supporting element, a base, and a light-permeable pillar. The supporting element has a first through-hole. A cam is disposed in the supporting element and has a second through-hole and a turning portion. The second through-hole is disposed corresponding to the first through-hole. The base extends to form a sleeve, and at least a light-emitting element is disposed in the sleeve. The light-permeable pillar passes through the first through-hole and the second through-hole and is inserted into the sleeve. A light emitted from the light-emitting element is projected into the light-permeable pillar so as to brighten the entire light-permeable pillar.

In one embodiment, the cam further has a holding portion, and the turning portion is protruded from the holding portion. The holding portion is capable of moving along a first direction for pushing the turning portion to contact against an inner wall of the supporting element, and the holding portion is also capable of moving along a second direction for pulling the turning portion to not contact against the inner wall of the supporting element.

In one embodiment, the base is configured with a plurality of feet and a plurality of magnetic elements.

To achieve the above objective, the present disclosure further discloses a supporting frame, which includes at least a supporting element, a base, and a light-permeable pillar. The supporting element has a first through-hole. The base extends to form a sleeve. The light-permeable pillar passes through the first through-hole and is inserted into the sleeve. The base is configured with a plurality of light-emitting elements, and a light emitted from the light-emitting elements is projected upwardly so as to brighten the supporting element and the light-permeable pillar.

In one embodiment, a cam is disposed in the supporting frame and has a second through-hole and a turning portion, and the second through-hole is disposed corresponding to the first through-hole.

In one embodiment, the cam further has a holding portion, and the turning portion is protruded from the holding portion. The holding portion is capable of moving along a first direction for pushing the turning portion to contact against an inner wall of the supporting element, and the holding portion is also capable of moving along a second direction for pulling the turning portion to not contact against the inner wall of the supporting element.

In one embodiment, the base is configured with a plurality of feet and a plurality of magnetic elements.

In one embodiment, the supporting frame is further configured with a marker having a third through-hole. The light-permeable pillar passes through the first through-hole, the second through-hole and the third through-hole and is inserted into the sleeve. The light-emitting elements are configured for brightening the marker.

As mentioned above, the supporting frame of this disclosure can be easily installed in the host apparatus and can adjust the position of the supporting frame to properly support the component installed in the host apparatus based on the actual situations such as the length and position of the interface card and the internal space of the case. In addition, the supporting frame can be installed to or uninstalled from the frame of the case without utilizing additional tool. Accordingly, the user can adjust the position of the supporting frame according to the other components inside the case, so that the supporting frame can be placed at a proper position for supporting the components installed in the host apparatus. Moreover, the base of the supporting frame is configured with light-emitting elements for brightening the Logo disposed on the supporting frame so as to achieve the decoration or advertising effect.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
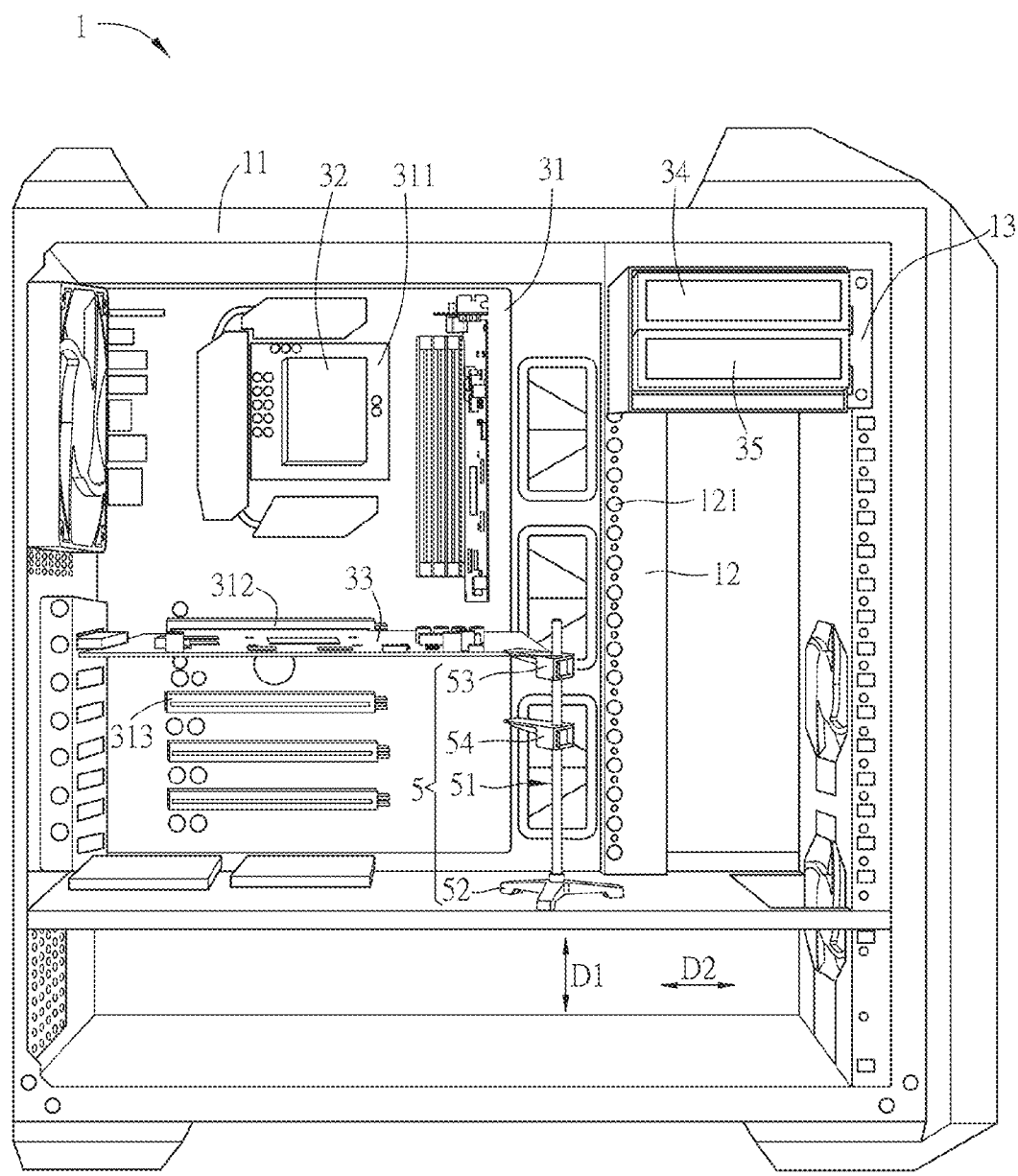
FIG. 1 is a schematic diagram showing a case and a supporting frame of a host apparatus according to an embodiment of the disclosure.

FIG. 1 is a schematic diagram showing a case and a supporting frame of a host apparatus according to an embodiment of the disclosure. As shown in FIG. 1, a host apparatus 1 includes a case 11, a frame 12, an internal expansion frame 13, a supporting frame 5 and a plurality of additional components such as a mainboard 31, a CPU 32, a graphic card 33, a storage device 34, an expansion device 35, and the likes. The frame 12, the internal expansion frame 13, the supporting frame 5 and the additional components (e.g. the mainboard 31, the CPU 32, the graphic card 33, the storage device 34, and the expansion device 35) are installed inside the case 11. The CPU 32 is installed on a socket 311 of the mainboard 31, and the storage device 34 and the expansion device 35 are installed on the internal expansion frame 13. The internal expansion frame 13 is fixed in the frame 12, and the frame 12 and the mainboard 31 are fixed in the case 11. The host apparatus 1 can be, for example but not limited to, a desktop computer. Of course, the host apparatus 1 can be any type of computer host.

In general, the user can directly operate the front side of the case, which usually contains the power button and the reset button. The rear side of the case is usually configured with various I/O ports for connecting different external devices such as the printer or network apparatus. In addition, the bottom side of the case is usually facing the ground.

In general configuration, the 3.5-inch devices are installed above the 2.5-inch devices. The 3.5-inch device can be, for example but not limited to, an optical disc drive, and the 2.5-inch device can be, for example but not limited to, a hard disc drive or a solid state drive. The expansion device 35 can be, for example but not limited to, a card reader. In addition, the internal expansion frames of the case 11 can be in a single spec. For example, the internal expansion frame 13 is configured for installing the 2.5-inch devices, and the storage device 34 and the expansion device 35 are both 2.5-inch devices. The storage device 34 is, for example but not limited to, a hard disc drive or a solid state drive, and the expansion device 35 is, for example but not limited to, a card reader.

The CPU 32 and the memory are usually installed on the top half of the mainboard 31, and the graphic card 33 is usually installed at the middle of the mainboard 31. The graphic processor of the graphic card 33 generally faces the bottom of the case 11 instead of the CPU 32. In other words, the front side of the graphic card 33 is installed with the graphic processor, the memory, and the heat sink, and the rear side thereof faces the CPU 32. Accordingly, the heats of the CPU 32 and the graphic card 33 can be dissipated through different areas of the case 11.

In general, the graphic card 33 is inserted to the interface socket 312 of the mainboard 31, which may divide the internal space of the case into two areas. The CPU 32 is located in the upper area, and the graphic card 33 is located in the middle area.

The frame 12 includes a plurality of positioning members 121, which can be randomly arranged or regularly arranged based on an arrangement rule. The user can select proper positioning members 121 to install other accessories (e.g. the internal expansion frame 13) based on the internal space of the case, the heat dissipating conditions, or the utility. In other words, the height of the internal expansion frame 13 inside the case 11 can be optionally adjusted by the user. In this embodiment, the positioning members 121 are regularly arranged, and the arrangement rule is, for example, to separately arrange the positioning member 121 with a fixed interval. In other embodiments, the arrangement rule can be another regular arrangement.

In this embodiment, the internal expansion frame 13 has a fixing portion, which is detachably connected to the positioning member 121 of the frame 12. The fixing portion can be detached by bare hands. The positioning member 121 and the fixing portion are corresponding shapes, such as a hole and a pin, and vice versa. In this embodiment, the positioning member 121 is a hole, and the fixing portion is a pin.

In this embodiment, the user can directly use one hand or two hands to install or uninstall the fixing portion without utilizing a screw driver or a wrench.

Figure 2A:
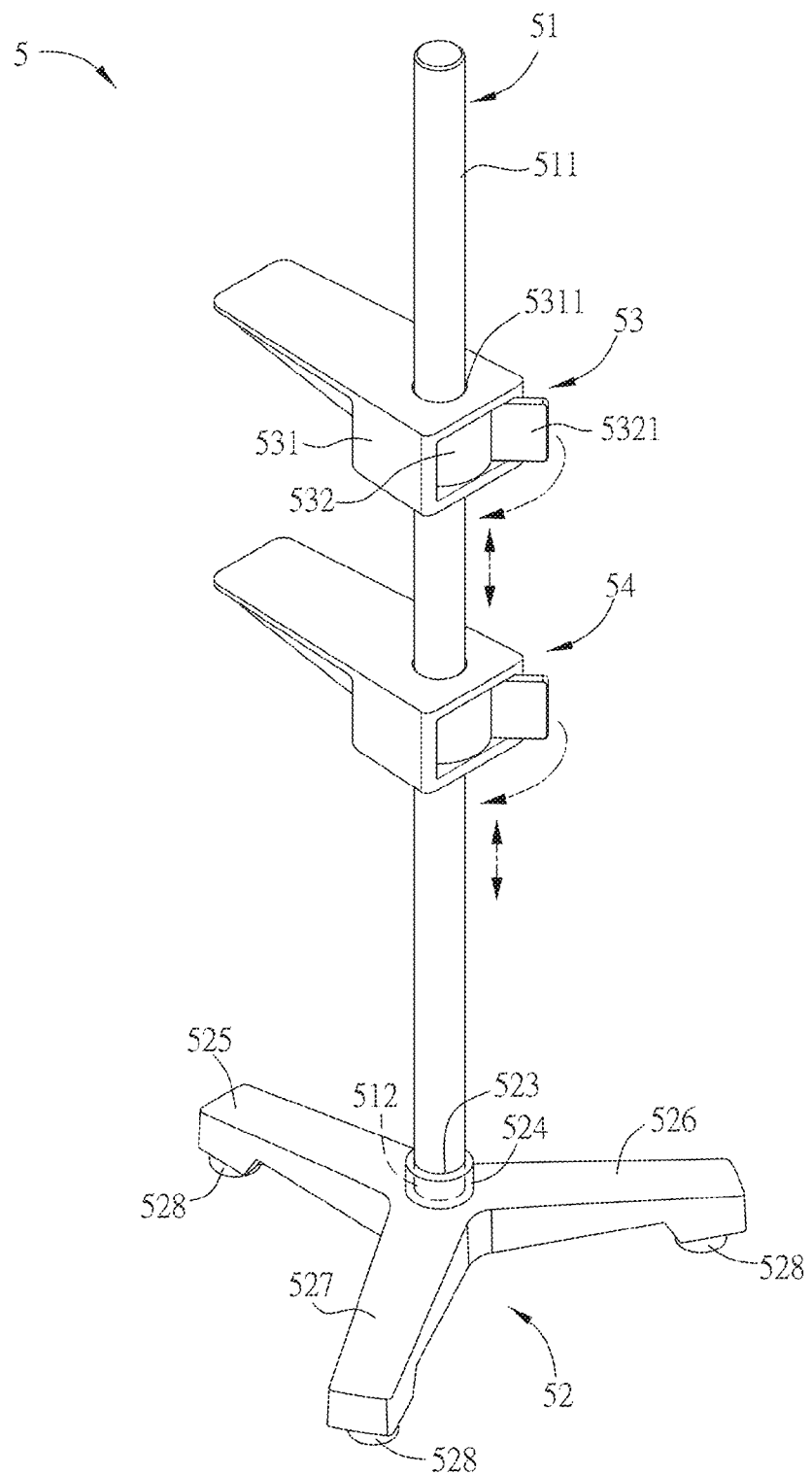
FIG. 2A is a schematic diagram showing the supporting frame of FIG. 1.

FIG. 2A is a schematic diagram showing the supporting frame of FIG. 1. Referring to FIGS. 1 and 2A, the supporting frame 5 includes a light-permeable pillar 51, a base 52, and two supporting elements 53 and 54. The light-permeable pillar 51 includes an installation portion 512 and a sliding guiding portion 511. The installation portion 512 is disposed at one end of the light-permeable pillar 51, and the sliding guiding portion 511 is located at the center of the light-permeable pillar 51. The base 52 is disposed on the installation portion 512, and is detachably disposed on the case 11. The supporting elements 53 and 54 are adjustably disposed on the sliding guiding portion 511. When the supporting elements 53 and 54 are fixed, one ends of the supporting elements 53 and 54 support at least one component installed in the host apparatus 1, such as a graphic card 33. When the positions of the supporting elements 53 and 54 are adjusted, the supporting elements 53 and 54 can be moved along the sliding guiding portion 511 and be rotated about the sliding guiding portion 511. The supporting elements 53 and 54 can be adjusted along the vertical direction (the first direction D1) for supporting the component installed in the host apparatus 1, such as a graphic card 33.

As shown in FIG. 1, a graphic card 33 is installed on the mainboard 31, and the supporting element 53 can support the graphic card 33. In addition, the host apparatus 1 may be installed with a plurality of graphic cards, which can be supported by a plurality of supporting elements. For example, the supporting element 53 supports the graphic card 33, and the supporting element 54 supports another graphic card.

Figure 2B:
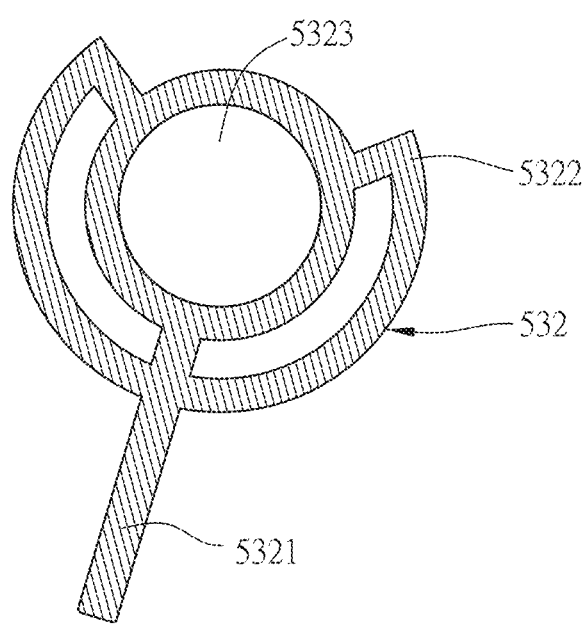
FIG. 2B is a schematic diagram showing a cam of an embodiment of the disclosure.

To be noted, the structures of the supporting elements 53 and 54 are the same, so only the detailed structures of the supporting element 53 are described hereinafter. FIG. 2B is a schematic diagram showing a cam of an embodiment of the disclosure. Referring to FIGS. 2A and 2B, the supporting element 53 includes a supporting body 531, which has a first through-hole 5311. A cam 532 is disposed in the supporting element 53 and has a second through-hole 5323. The second through-hole 5323 is disposed corresponding to the first through-hole 5311. The base 52 extends to form a sleeve 524. The light-permeable pillar 51 passes through the first through-hole 5311 and the second through-hole 5323 and is inserted into the sleeve 524.

As shown in FIG. 2B, the cam 532 has a holding portion 5321 and a turning portion 5322. As shown in FIG. 2A, the supporting element 53 is fixed to the sliding guiding portion 511. The user can push the holding portion 5321 to left to rotate the cam 532 so as to adjust the position of the supporting element 53 on the sliding guiding portion 511. In this embodiment, the holding portion 5321 of the cam 532 has a plate shape for an example, and this disclosure is not limited thereto.

Figure 2C:
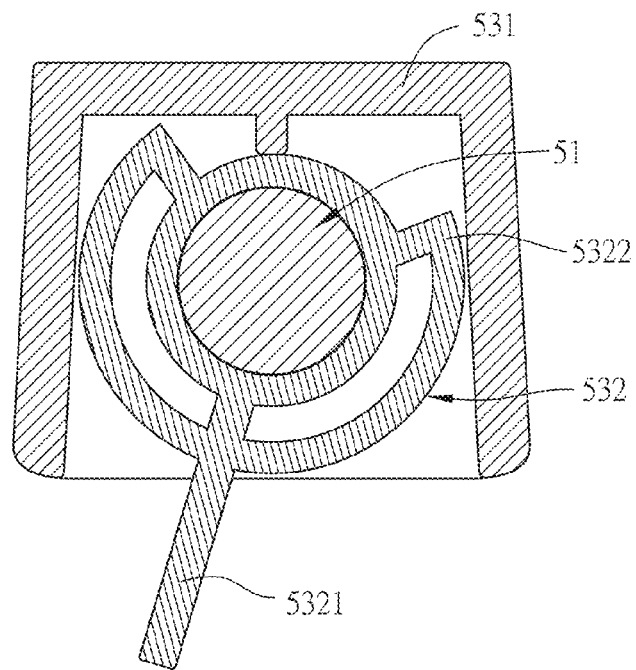
FIGS. 2C and 2D are top views of the cam of FIG. 2B in operation.
Figure 2D:
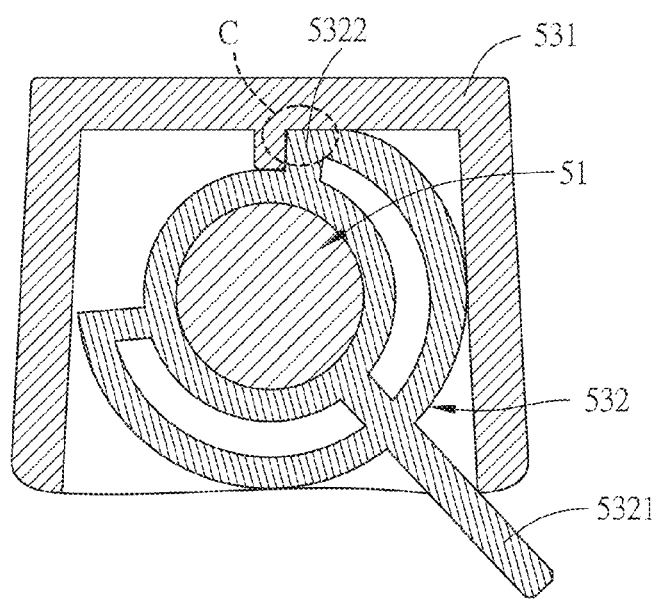

FIGS. 2C and 2D are top views of the cam of FIG. 2B in operation. As shown in FIG. 2C, the cam 532 is still not fixed, so that the user can adjust the supporting element 53 to move along the sliding guiding portion 511 and to rotate about the sliding guiding portion 511. When the user pushes the holding portion 5321 of the cam 532 to right (as shown in FIG. 2D), the turning portion 5322 contacts against the inner wall of the supporting body 531. Then, the turning portion 5322 is pressed by the inner wall (the label C), so the cam 532 can be fixed to the sliding guiding portion 511 of the light-permeable pillar 51 by the pressing force toward the axis. Accordingly to the above operation, the supporting element 53 can be fixed to any position on the light-permeable pillar 51 for supporting the component installed in the host apparatus 1. In this embodiment, the supporting element 53 is fixed on the light-permeable pillar 51 by the cam 532. Otherwise, the supporting element 53 can also be fixed on the light-permeable pillar 51 by screwing or other approaches.

As shown in FIG. 2A, the base 52 has a sleeve 524 and three feet 525, 526 and 527. The sleeve 524 has an opening 523 and is mounted on the installation portion 512. In this embodiment, the feet 525, 526 and 527 have a pillar shape, and the bottoms of the feet 525, 526 and 527 have a wider design for firmly standing on the ground. The feet 525, 526 and 527 are radially arranged around the sleeve 524. The sleeve 524 and the feet 525, 526 and 527 can be integrally formed as one piece. For example, the base 52 can be formed by injection molding to form a whole plastic piece. The opening 523 of the sleeve 524 can be directly mounted on the installation portion 512 of the light-permeable pillar 51, and the assembling procedure is very simple. Besides, the base 52 can be formed with different numbers of feet by injection molding. That is, the base 52 can be formed with two, four or five feet or more. The shape of the feet can be modified by the injection molding. For example, the feet can be curved plates or cylinders.

In the above embodiment, the light-permeable pillar 51 is a cylinder with a fixed diameter. In addition, the light-permeable pillar 51 can be a polygonal pillar (e.g. a hexagonal or dodecagonal pillar). Accordingly, the angle of the supporting element 53 can be adjusted step by step. The sliding guiding portion 511 and the installation portion 512 of the light-permeable pillar 51 can be pillars with different sizes or different shapes. For example, the sliding guiding portion 511 and the installation portion 512 are both cylinders, and the diameter of the sliding guiding portion 511 is larger than the diameter of the installation portion 512. Otherwise, the sliding guiding portion 511 is a polygonal pillar, and the installation portion 512 is a cylinder. The shape of the opening 523 of the sleeve 524 can also be modified by the injection molding to match the shape of the installation portion 512.

Each of the feet 525, 526 and 527 is configured with a magnetic element 528, which can attach to the case 11. Accordingly, the user can easily remove the supporting frame 5 from the case 11 or fix the supporting frame 5 to the case 11 by bare hand(s). In this embodiment, the magnetic elements 528 are disposed at the ends of the feet 525, 526 and 527, respectively. Of course, the magnetic elements 528 can be disposed at any positions on the feet 525, 526 and 527, and each of the feet 525, 526 and 527 may include two or more magnetic elements 528 for firmly fixing the supporting frame 5 to the case 11. In addition, the magnetic elements 528 can be made of a material with permanent magnetism, such as permanent magnets.

Figure 3:
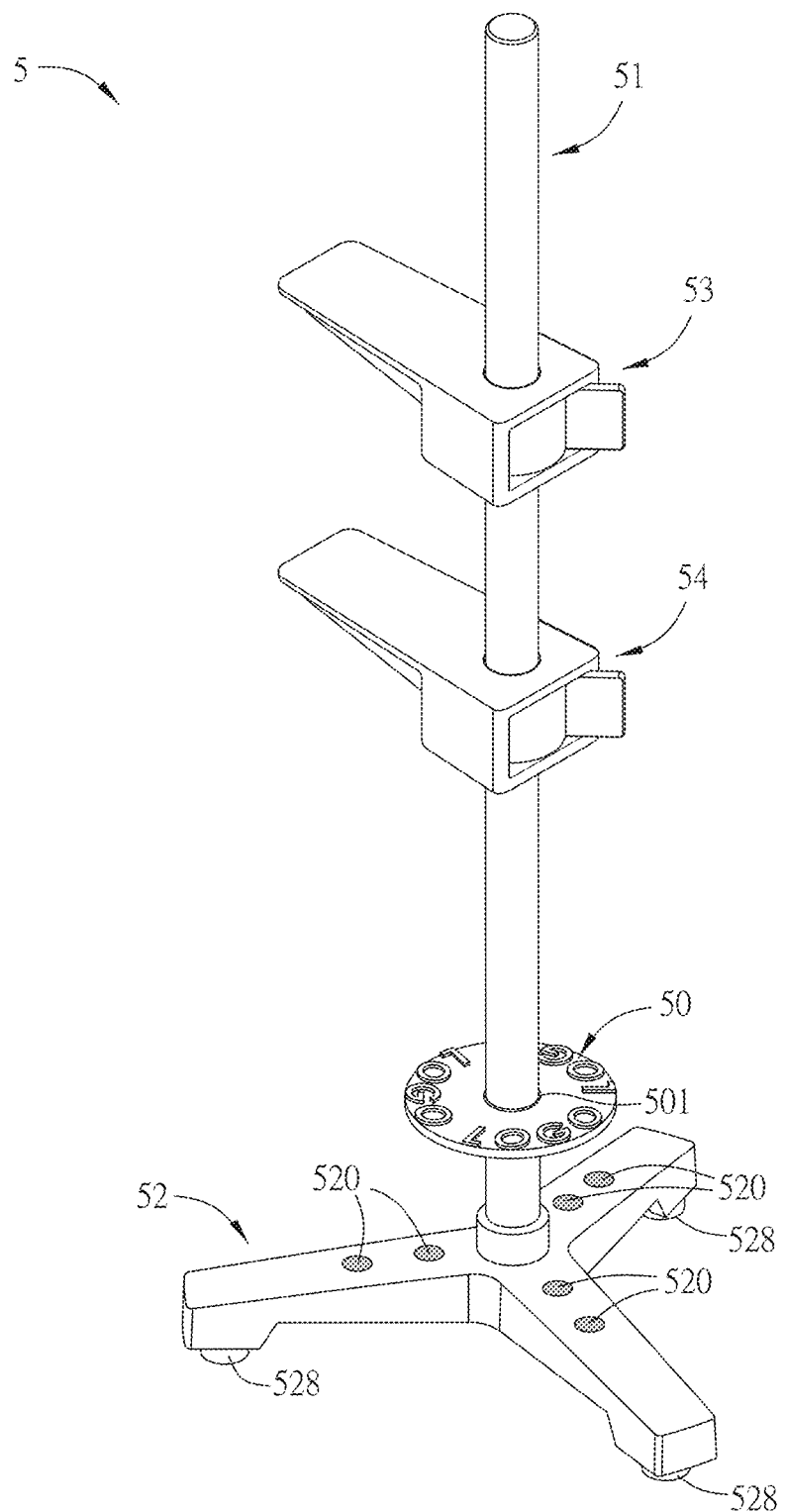
FIG. 3 is a schematic diagram showing a supporting frame according to another embodiment of the disclosure.

FIG. 3 is a schematic diagram showing a supporting frame according to another embodiment of the disclosure. As shown in FIG. 3, the light-permeable pillar 51 is configured with a marker 50. The marker 50 may include texts or patterns (e.g. a Logo of a company), and the base 52 is installed with at least one light-emitting element 520 for brightening the marker 50. In this embodiment, the marker 50 is disposed on one side of the light-permeable pillar 51 closing to the light-emitting element 520 for providing a better irradiation effect. In addition, the light-permeable pillar 51 can be a hollow acrylic tube or a solid acrylic stick.

As shown in FIG. 3, the base 52 is configured with a plurality of light-emitting elements 520, and the light emitted from the light-emitting elements 520 is projected upwardly so as to brighten the light-permeable pillar 51 and the supporting elements 53 and 54. The light-emitting elements 520 (e.g. LED) can be embedded on the surfaces of the feet 525, 526 and 527, and are connected to the power source of the host apparatus 1 through external wires or connected to the battery disposed inside the base 52 for obtaining the driving power. The marker 50 and the case 11 can be made of the transparent materials. For example, when the light-emitting elements 520 of the base 52 emit light, the emitted light can pass through the marker 50 to display the image of the Logo and brighten the entire light-permeable pillar 51. This configuration can provide a decoration effect or an advertising effect. As mentioned above, the user can see the displayed Logo image through the marker 50 and the case 11.

In the above embodiment, the light-emitting elements 520 are embedded on the surfaces of the feet 525, 526 and 527. Of course, the light-emitting elements 520 can be disposed in the sleeve 524 extending from the base 52. In this case, the light-emitting elements 520 installed inside the sleeve 524 can emit light to the inside of the light-permeable pillar 51, thereby brightening the entire light-permeable pillar 51.

In the above embodiments, the supporting frame is configured for supporting the graphic card, but this disclosure is not limited thereto. In practice, the supporting frame of the above embodiments can be used in various applications for supporting, for example, the heat sink, radiator, SSD module, and the likes.

In summary, the supporting frame of this disclosure can be easily installed in the host apparatus and can adjust the position of the supporting frame to properly support the component installed in the host apparatus based on the actual situations such as the length and position of the interface card and the internal space of the case. In addition, the supporting frame can be installed to or uninstalled from the frame of the case without utilizing additional tool. Accordingly, the user can adjust the position of the supporting frame according to the other components inside the case, so that the supporting frame can be placed at a proper position for supporting the components installed in the host apparatus. Moreover, the base of the supporting frame is configured with light-emitting elements for brightening the Logo disposed on the supporting frame so as to achieve the decoration or advertising effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A supporting frame, comprising:
   at least a supporting element having a first through-hole, wherein a cam is disposed in the supporting element and has a second through-hole and a turning portion, and the second through-hole is disposed corresponding to the first through-hole;
   a base extending to form a sleeve; and
   a light-permeable pillar passing through the first through-hole and the second through-hole and inserted into the sleeve, wherein the supporting element is capable of sliding along the light-permeable pillar, and the turning portion is configured for pushing against an inner wall of the supporting element for fixing the supporting element on the light-permeable pillar;
   wherein the base is configured with a plurality of feet and a plurality of magnetic elements.

2. The supporting frame of claim 1, wherein the base is configured with a plurality of light-emitting elements.

3. The supporting frame of claim 1, wherein the cam further has a holding portion, the turning portion is protruded from the holding portion, the holding portion is capable of moving along a first direction for pushing the turning portion to contact against the inner wall of the supporting element, and the holding portion is also capable of moving along a second direction for pulling the turning portion to not contact against the inner wall of the supporting element.

4. The supporting frame of claim 1, wherein the supporting frame is further configured with a marker having a third through-hole, and the light-permeable pillar passes through the first through-hole, the second through-hole and the third through-hole and is inserted into the sleeve.

5. A supporting frame, comprising:
   at least a supporting element having a first through-hole, wherein a cam is disposed in the supporting element and has a second through-hole and a turning portion, and the second through-hole is disposed corresponding to the first through-hole;
   a base extending to form a sleeve, wherein at least a light-emitting element is disposed in the sleeve; and
   a light-permeable pillar passing through the first through-hole and the second through-hole and inserted into the sleeve, wherein a light emitted from the light-emitting element is projected into the light-permeable pillar so as to brighten the entire light-permeable pillar.

6. The supporting frame of claim 5, wherein the cam further has a holding portion, the turning portion is protruded from the holding portion, the holding portion is capable of moving along a first direction for pushing the turning portion to contact against an inner wall of the supporting element, and the holding portion is also capable of moving along a second direction for pulling the turning portion to not contact against the inner wall of the supporting element.

7. The supporting frame of claim 5, wherein the base is configured with a plurality of feet and a plurality of magnetic elements.

8. A supporting frame, comprising:
   at least a supporting element having a first through-hole;
   a base extending to form a sleeve; and
   a light-permeable pillar passing through the first through-hole and inserted into the sleeve, wherein the base is configured with a plurality of light-emitting elements, and a light emitted from the light-emitting elements is projected upwardly so as to brighten the supporting element and the light-permeable pillar.

9. The supporting frame of claim 8, wherein a cam is disposed in the supporting frame and has a second through-hole and a turning portion, and the second through-hole is disposed corresponding to the first through-hole.

10. The supporting frame of claim 9, wherein the cam further has a holding portion, the turning portion is protruded from the holding portion, the holding portion is capable of moving along a first direction for pushing the turning portion to contact against an inner wall of the supporting element, and the holding portion is also capable of moving along a second direction for pulling the turning portion to not contact against the inner wall of the supporting element.

11. The supporting frame of claim 8, wherein the base is configured with a plurality of feet and a plurality of magnetic elements.

12. The supporting frame of claim 8, wherein the supporting frame is further configured with a marker having a third through-hole, the light-permeable pillar passes through the first through-hole, the second through-hole and the third through-hole and is inserted into the sleeve, and the light-emitting elements are configured for brightening the marker.

13. A supporting frame, comprising:
   at least a supporting element having a first through-hole, wherein a cam is disposed in the supporting element and has a second through-hole and a turning portion, and the second through-hole is disposed corresponding to the first through-hole;
   a base extending to form a sleeve; and
   a light-permeable pillar passing through the first through-hole and the second through-hole and inserted into the sleeve, wherein the supporting element is capable of sliding along the light-permeable pillar, and the turning portion is configured for pushing against an inner wall of the supporting element for fixing the supporting element on the light-permeable pillar, wherein the base is configured with a plurality of light-emitting elements.

14. A supporting frame, comprising:
   at least a supporting element having a first through-hole, wherein a cam is disposed in the supporting element and has a second through-hole and a turning portion, and the second through-hole is disposed corresponding to the first through-hole;

a base extending to form a sleeve; and a light-permeable pillar passing through the first through-hole and the second through-hole and inserted into the sleeve, wherein the supporting element is capable of sliding along the light-permeable pillar, and the turning portion is configured for pushing against an inner wall of the supporting element for fixing the supporting element on the light-permeable pillar, wherein the cam further has a holding portion, the turning portion is protruded from the holding portion, the holding portion is capable of moving along a first direction for pushing the turning portion to contact against the inner wall of the supporting element, and the holding portion is also capable of moving along a second direction for pulling the turning portion to not contact against the inner wall of the supporting element.

* * * * *